(12) United States Patent
Lee et al.

(10) Patent No.: US 11,506,885 B2
(45) Date of Patent: Nov. 22, 2022

(54) BONDING LAMINATED FILM AND LIGHT-TRANSMITTING LAMINATE COMPRISING THE SAME

(71) Applicant: SKC Co., Ltd., Suwon-si (KR)

(72) Inventors: Haksoo Lee, Suwon-si (KR); Sungjin Chung, Seoul (KR); Heungsik Kim, Seoul (KR)

(73) Assignee: SKC Co., Ltd., Suwon-Si (KR)

( * ) Notice: Subject to any disclaimer, the term of this patent is extended or adjusted under 35 U.S.C. 154(b) by 0 days.

(21) Appl. No.: 17/466,135

(22) Filed: Sep. 3, 2021

(65) Prior Publication Data

US 2021/0396996 A1    Dec. 23, 2021

Related U.S. Application Data

(63) Continuation of application No. PCT/KR2020/000785, filed on Jan. 16, 2020.

(30) Foreign Application Priority Data

Apr. 30, 2019  (KR) .................. 10-2019-0050952

(51) Int. Cl.
*G02B 27/00* (2006.01)
*B32B 17/10* (2006.01)
(Continued)

(52) U.S. Cl.
CPC .......... *G02B 27/0018* (2013.01); *B32B 3/263* (2013.01); *B32B 7/023* (2019.01);
(Continued)

(58) Field of Classification Search
CPC .......... G02B 27/0018; B32B 17/10761; B32B 17/10605; B32B 17/1077;
(Continued)

(56) References Cited

U.S. PATENT DOCUMENTS 7,656,585 B1    2/2010  Powell et al.
2006/0008658 A1*  1/2006  Fukatani ............... B60R 21/34
                                                  428/437
(Continued)

FOREIGN PATENT DOCUMENTS

CA    3023395 A1 *  1/2018  ............ B32B 17/10
CN    101038349 A     9/2007
(Continued)

OTHER PUBLICATIONS

International Search Report dated Sep. 22, 2019 in counterpart International Patent Application No. PCT/KR2020/000785 (2 pages in English and 2 pages in Korean).
(Continued)

*Primary Examiner* — Tahseen Khan
(74) *Attorney, Agent, or Firm* — NSIP Law (57) ABSTRACT

A bonding laminated film for bonding, and a light transmission laminate are provided. The bonding laminating film and the light transmission laminate comprise a first layer comprising a first surface and a second surface opposite to the first surface, and a second layer disposed inside the first layer and comprising a wedge part whose cross section is triangular or trapezoidal in a part or a whole of the second layer. The refractive index of the second layer is higher than the refractive index of the first layer. The bonding laminated film has an overall even thickness, and has anti-double-image elements in a desired area though a bonding laminated film, and has a substantially non-wedge shape.

12 Claims, 5 Drawing Sheets

(51) Int. Cl.
  *B32B 7/023* (2019.01)
  *B32B 3/26* (2006.01)
(52) U.S. Cl.
  CPC ........ *B32B 17/10* (2013.01); *B32B 17/10036* (2013.01); *B32B 17/1077* (2013.01); *B32B 17/10568* (2013.01); *B32B 17/10605* (2013.01); *B32B 17/10761* (2013.01); *B32B 2307/102* (2013.01); *B32B 2307/418* (2013.01); *B32B 2605/006* (2013.01)
(58) Field of Classification Search
  CPC .............. B32B 17/10036; B32B 3/263; B32B 17/10568; B32B 7/023
  USPC ........................................................ 359/601
  See application file for complete search history.

(56) References Cited

U.S. PATENT DOCUMENTS

| | | | | |
|---|---|---|---|---|
| 2007/0148472 | A1* | 6/2007 | Masaki | B32B 17/10981 428/426 |
| 2010/0046075 | A1 | 2/2010 | Powell et al. | |
| 2017/0003503 | A1 | 1/2017 | Arndt et al. | |
| 2018/0149865 | A1* | 5/2018 | Arndt | G02B 27/0101 |

FOREIGN PATENT DOCUMENTS

| | | | |
|---|---|---|---|
| CN | 107848271 | A | 3/2018 |
| CN | 108025968 | A | 5/2018 |
| CN | 110650931 | A | 1/2020 |
| JP | 2004-203680 | A | 7/2004 |
| JP | 2007-223883 | A | 9/2007 |
| KR | 10-2006-0032661 | A | 4/2006 |
| KR | 10-2006-0120599 | A | 11/2006 |
| KR | 10-2006-0120599 | A | 11/2006 |
| KR | 10-1310022 | B1 | 9/2013 |
| KR | 10-2018-0081782 | A | 7/2018 |
| KR | 10-2019-0013861 | A | 2/2019 |
| KR | 10-2019-0019160 | A | 2/2019 |

OTHER PUBLICATIONS

Korean Decision to Grant a Patent dated Jan. 4, 2021 in counterpart Korean Patent Application No. 10-2019-0050952 (1 pages in English and 5 pages in Korean).

Korean Office Action dated Aug. 28, 2020 in counterpart Korean Patent Application No. 10-2019-0050952 (7 pages in English and 5 pages in Korean).

* cited by examiner

BONDING LAMINATED FILM AND LIGHT-TRANSMITTING LAMINATE COMPRISING THE SAME

Pursuant to 35 USC 120 and 365(c), this application is a continuation of International Application No. PCT/KR2020/000785 filed on Jan. 16, 2020, which claims the benefit of Korean Patent Application No. 10-2019-0050952, filed on Apr. 30, 2019, in the Korean Intellectual Property Office, the entire disclosures of which are incorporated herein by reference for all purposes.

BACKGROUND

1. Field

The following disclosure relates to a bonding laminated film having anti-double-image functionality, and a light transmission laminate comprising the same.

2. Description of Related Art

Polyvinyl acetal may be implemented in laminated glass (safety glass) or an interlayer of a light transmission laminate. Laminated glass may be mainly used in windows of architecture, cladding, and window glass of automobiles, and due to characteristics, such as anti-scattering of glass fragments when broken, and penetration resistance against impact of a certain strength, laminated glass secure stability to minimize damage or injury to objects or people placed in the vicinity of the laminated glass.

Head Up Display (HUD) is increasingly being installed in automobiles. Specifically, in an example of applying head up display, when an image is reflected on a windshield of an automobile by a projector at a dashboard area or a roof area of an automobile, this reflected image is perceived by a driver. Such a head up display can make possible for a driver to simultaneously obtain important data such as current driving information, navigation information, and warning messages, even when the driver watches a road ahead. This capability may improve the convenience of driving and increase traffic safety.

Since a head up display reflects a projector image to a windshield of an automobile, the image is reflected in both surfaces (an inside surface and an outside surface) of the windshield, so that the head up display has a basic problem, which is that, not only a desired primary image, but also a secondary image (ghost image) together in a weaker intensity may be perceived to a driver. This problem may be solved by applying a wedge-shaped vertical cross section as an interlayer between a pair of glass.

However, such a wedge-shaped interlayer may degrade windability and workability.

The above information disclosed in this Background section is only for enhancement of understanding of the background of the invention, and therefore it may contain information that does not form the related art that is already known in this country to a person of ordinary skill in the art.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In a general aspect, a bonding laminated film includes a first layer, and a second layer disposed inside the first layer, wherein the second layer comprises a wedge part disposed either partially in the second layer or through an entirety of the second layer, and a refractive index of the wedge part is higher than a refractive index of the first layer.

The first layer may include a first surface, and a second surface opposite to the first surface, and a distance between the first surface and the second surface may be even in a width direction of the bonding laminated film.

A film thickness of the wedge part may be a thickness of the bonding laminated film measured at a location where a first end of the wedge part is disposed, and a location where a second end of the wedge part is disposed, and the film thickness of the wedge part may have a difference with the thickness of the entire bonding laminated film by 10% or less.

The wedge part may have a wedge angle of 0.1 degrees to 0.8 degrees.

A difference between the refractive index of the wedge part and the refractive index of the first layer may be equal to or greater than 0.08.

The length of the wedge part may be equal to or greater than 7 cm.

The wedge part may be disposed in a position of 10% to 50% from a side of an edge, when a width of the bonding laminated film is designated as 100%.

The wedge part may be configured to have a thicker portion which has a thickness of 800 µm or less.

A resin of the first layer may be different from a resin of the second layer.

The bonding laminated film may further include a function layer, configured to have sound insulation functionality, wherein the function layer is disposed inside the first layer.

The function layer may be disposed on one side of the second layer.

The second layer may have a refractive index of 1.55 or more.

The first layer may have a refractive index less than 1.50.

In a general aspect, a bonding laminated film having a first side and a second side opposite to the first side, the bonding laminated film includes a first layer, and a second layer disposed on the first layer, wherein the second layer comprises a wedge part disposed in a portion of the second layer, a refractive index of the wedge part is higher than a refractive index of the first layer, and a distance between a first side of the bonding laminated film and a second side of the bonding laminated film is even in a width direction of the bonding laminated film.

In a general aspect, a light transmission laminate includes a first light transmission layer; a bonding laminated film disposed on one side of the first light transmission layer; and a second light transmission layer disposed on the bonding laminated film; wherein the bonding laminated film includes a first layer, and a second layer disposed inside the first layer, wherein the second layer comprises a wedge part disposed either partially in the second layer or through an entirety of the second layer, and a refractive index of the wedge part is higher than a refractive index of the first layer.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

In this application, the phrase "combination(s) thereof" included in a Markush-type expression denotes one or more mixtures or combinations selected from the group consisting of components stated in the Markush-type expression, that is, denotes that one or more components selected from the group consisting of the components are included.

In an example of applying a bonding laminated film with a wedge-shaped cross section, because surfaces of a film are not substantially parallel to each other, when wound, a thicker portion is wound to be hard and a thinner portion is wound to be loose thereby generating a wrinkle, and this gives inconvenience to moving and storing with lowered workability which is caused from a work of removing the wrinkled portion. An anti-double-image effect and the like are obtained by introducing an internal wedge shape with a controlled refractive index. This is discussed below in various example embodiments.

The example bonding laminated film having anti-double-image functionality, and a light transmission laminate may be implemented as a windshield, and may therefore provide a bonded laminated film that has a substantially even thickness overall and anti-double-image functionality.

A bonded laminated film, and a light transmission laminate including the same may provide a laminated film implemented in a head up display which is even in the total thickness, has anti-double-image functionality in a desired portion with substantial non-wedge shape, and thereby has a storability, mobility, and workability that are more effective than a wedge-shaped film.

FIGS. 1A to 4A and 4B are respectively conceptual views illustrating a structure of a bonding laminated film, in accordance with one or more embodiments. Hereinafter, with reference to the drawings, example embodiments will be described in further detail.

Figure 1A:
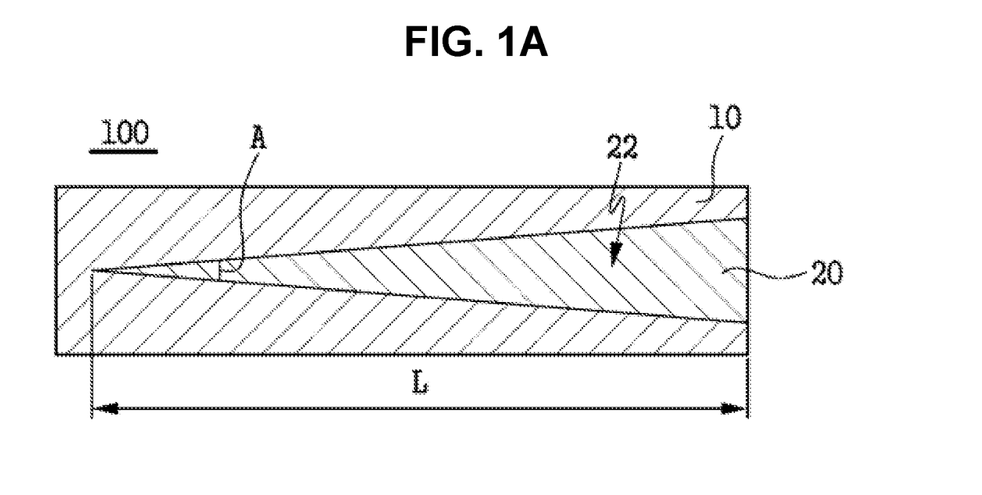
FIGS. 1A and 1B are conceptual views illustrating a structure of a bonding laminated film, in accordance with one or more embodiments, by using cross sections, respectively.
Figure 1B:
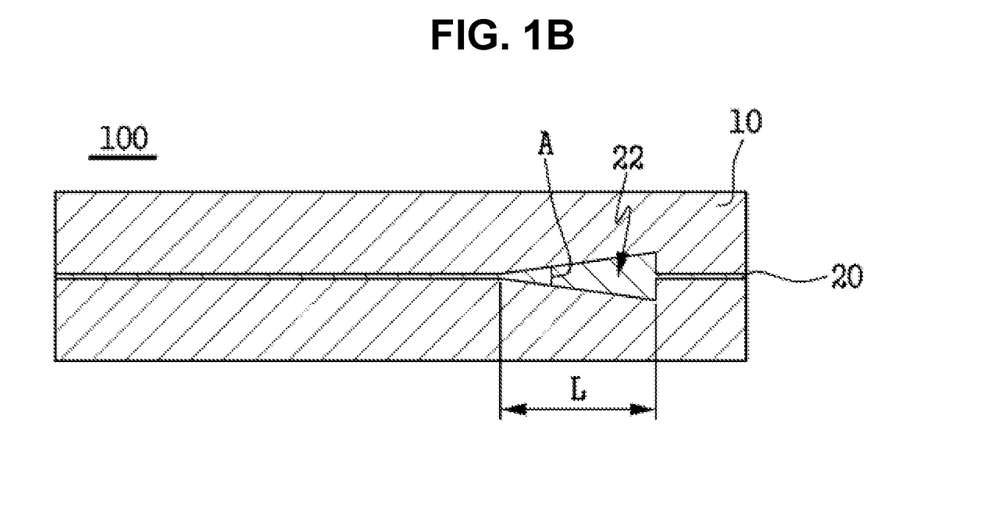

Referring to FIGS. 1A and 1B, in a general aspect, a bonding laminated film 100, in accordance with one or more embodiments, comprises a first layer 10 comprising a first surface and a second surface opposite to the first surface, and a second layer 20 comprising a wedge part 22 disposed inside the first layer and having a cross section in a triangle shape or a trapezoid shape in part or a whole of the second layer, wherein the refractive index of the second layer is higher than the refractive index of the first layer.

The wedge part 22 refers to a layer having, as a non-limited example, a wedge-shape and may be formed in an entire surface of the bonding laminated film 100 overall (the whole wedge) or may be formed in a small size by specifying some position of the bonding laminated film to prevent double-image occurrence.

The bonding laminated film 100 may have a predetermined overall thickness.

The bonding laminated film 100 may have a second layer 20 which is substantially disposed inside a first layer 10, and at least some of the second layer comprises, as an example, a wedge part 22 having a wedge shape.

The bonding laminated film 100 may have a shape of a general laminated film in which a first surface and a second surface are substantially parallel when observed from an external position, and does not have a wedge shape. However, the bonding laminated film 100 has materials of a first layer and a wedge part different in refractive index from each other, so that the route of light may be changed, and thereby may substantially have a single image in a position of 1 to 2 m from the film, not having a double image like a general film.

In an example, the wedge part 22 may have a triangular shape, or a trapezoidal shape overall. When the wedge part is a triangular shape, the triangle may be an isosceles triangle, a right triangle, or so on, and specifically, an isosceles triangle shape may be applied (refer to FIG. 1 and FIG. 3).

The wedge part 22 may have a triangle shape or a trapezoid shape comprising an arc shape of circle or ellipse in some parts. Additionally, the shape of the wedge part comprising the arc shape in some may be a shape in which a discontinuity part between a vertex and the arc shape from the cross section is removed (refer to FIGS. 4A and 4B).

In an example, when the wedge part 22 comprises an arc shape of a circle or an ellipse in some part, the arc comprised in the wedge part may be disposed to be in contact with, or be close to, the base line of the triangle shape, and the wedge part may have a shape in which a discontinuity part between the vertex and the arc shape, which is distinct by a tangent line where the vertex of the triangle shape and the arc meet, is excluded from the wedge part.

In an example, when the wedge part 22 comprises an arc shape of a circle or an ellipse in some part, the arc comprised in the wedge part may be disposed to be in contact with the base line of the trapezoid shape, or be close to the base line, and the wedge shape may have a shape in which a discontinuity part between the trapezoid shape and the arc shape, which is distinct by a tangent line where a virtual point crossed with an extended line of a side of the trapezoid shape and the arc meet, is excluded from the wedge part.

The wedge part 22 may have a wedge angle (A) of 0.1 degrees to 0.8 degrees, or 0.2 degrees to 0.7 degrees.

Additionally, the wedge part 22 may have a wedge angle (A) of 0.3 degrees to 0.6 degrees, 0.32 degrees to 0.58 degrees, or 0.34 degrees to 0.43 degrees. In such an example, an anti-double-image effect may be achieved more efficiently. When the wedge part is a triangle shape, an angle from a vertex may correspond to the wedge angle, and when the wedge part is a trapezoid shape, an angle from a point where extended lines of both sides of the trapezoid meets may correspond to the wedge angle.

To have an anti-double-image effect, the refractive index of the second layer 20 (particularly, the refractive index of a wedge part) may have a higher refractive index compared to the refractive index of the first layer 10.

In detail, the wedge part 22 and the first layer 10 may have a difference of refractive index by 0.08 or more, or 0.1 or more. Specifically, the wedge part 22 and the first layer 10 may have a difference of refractive index by 0.11 or more, or 0.12 or more. In detail, the wedge part 22 and the first layer 10 may have a difference of refractive index by 0.5 or less, 0.3 or less, 0.2 or less, or 0.15 or less. A bonding laminated film having such a characteristic of difference in refractive index is more advantageous in that a double image is not formed substantially in a position within 1 to 2 m away from the bonding laminated film. The difference of refractive index is a value which is obtained by subtracting a lower value from a higher value in refractive index and expressed in a positive number, so that a value obtained by subtracting the refractive index of the first layer from the refractive index of the second layer may be applied.

The bonding laminated film 100 also has a characteristic of having a predetermined thickness, with such a difference in refractive index of the first layer and the second layer (or wedge part).

Specifically, the thicknesses of the bonding laminated film 100 measured at a point where one end of the wedge part 22 is placed and a point where the other end is placed, may have a difference in thickness of 10% or less, 5% or less, or 2% or less compared to the entire thickness of the bonding laminated film, when the entire thickness of the bonding laminated film is designated as 100%. Accordingly, when the wedge part is observed in a cross section, the thickest portion and the thinnest side within the wedge part is respectively referred to as one end and the other end (same as below).

Specifically, the thicknesses of the bonding laminated film measured at a point where one end of the wedge part 22 is placed and a point where the other end is placed may be substantially equal.

The bonding laminated film 100 may not substantially have a wedge shape when observed at a cross section cut in a width direction.

Not substantially having a wedge shape means that the difference in thickness of the bonding laminated film between one end and the other end is within a certain range, when observed at a cross section cut in a width direction. Specifically, when the average thickness of the bonding laminated film is designated as 100%, the difference in thickness measured at one end and the other end may have a difference in thickness of 10% or less compared to the entire thickness of the bonding laminated film. Specifically, the bonding laminated film 100 may have a difference in thickness measured at one end and the other end of 5% or less, or 2% or less compared to the entire thickness of the bonding laminated film, when the average thickness of the bonding laminated film is designated as 100%.

Not having substantially a wedge shape means that when the bonding laminated film 100 is observed at a cross section cut in a width direction, the angle from a point where i) an extended line of a virtual line which links a point of contact with a first surface from one end and a point of contact with a first surface from the other end, and ii) an extended line of a virtual line which links a point of contact with a second surface from a first end and a point of contact with a second surface from a second end meet, may be 0.01 degree or less, 0.0057 degree or less, or 0.0045 degree or less, or two extended lines do not meet substantially. In a bonding laminated film that has such an angle, it may be difficult to have double-image forming functionality due to the whole form of the laminated film, and double-image forming functionality can be achieved by applying a method of refractive index regulation and the like applied in example embodiments.

Additionally, the bonding laminated film 100 may have a distance between the first surface and the second surface which is substantially even, and the first surface and the second surface may be substantially parallel.

Additionally, the bonding laminated film 100 may have substantially the same thickness in a first end and a second end of the first surface.

When a similar anti-double-image effect to a wedge-shaped film is obtained by applying a wedge structure inside a film even though the film has a non-wedge shape overall, it is possible to provide a bonding laminated film having a head up display functionality and is greatly improved in winding and workability.

The wedge part 22 may be applied in a form of a wedge for a whole surface of the film or a part of a surface of the film.

Specifically, the length (L) of the wedge part may be 85% or more when the width or the length corresponding to the width of the bonding laminated film is designated as 100%. Specifically, the length (L) of the wedge part may be 7 cm or more, 7.5 cm or more, 8 cm or more, or 9 cm or more.

When the wedge part 22 has such a length, it is easier to manufacture a film which performs a head up display function with an inside wedge shape.

The wedge part 22 may be disposed in a position of 10 to 50%, 10 to 40%, or 10 to 30% from the edge, when the width of the entire laminated film 100 is designated as 100%. When the wedge part 22 is disposed in such a position, it is advantageous for obtaining a harmonious anti-double-image effect in a laminate (ex. laminated glass) applied with the bonding laminated film 100.

The wedge part 22 may have a thickness of a thicker portion between a first end and a second end of 1800 µm or less, 1200 µm or less, 800 µm or less, 780 µm or less, or 760 µm or less.

When the thickness of the laminated film for bonding 100 is designated as 100%, the thickness of a thicker portion between a first end and a second end of the wedge part 22 may be 30 to 99%, 50 to 98%, or 60 to 97%.

Figure 2A:
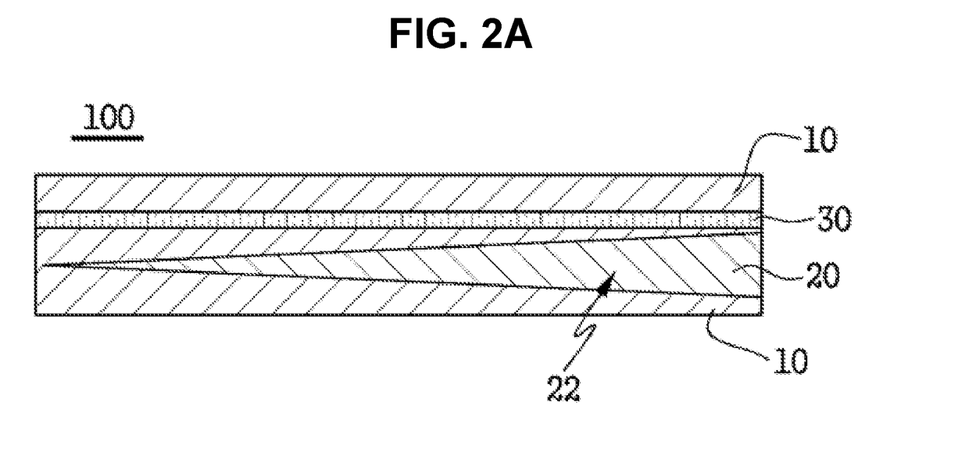
FIGS. 2A and 2B are conceptual views illustrating a structure of a bonding laminated film, in accordance with one or more embodiments, by using cross sections, respectively.
Figure 2B:
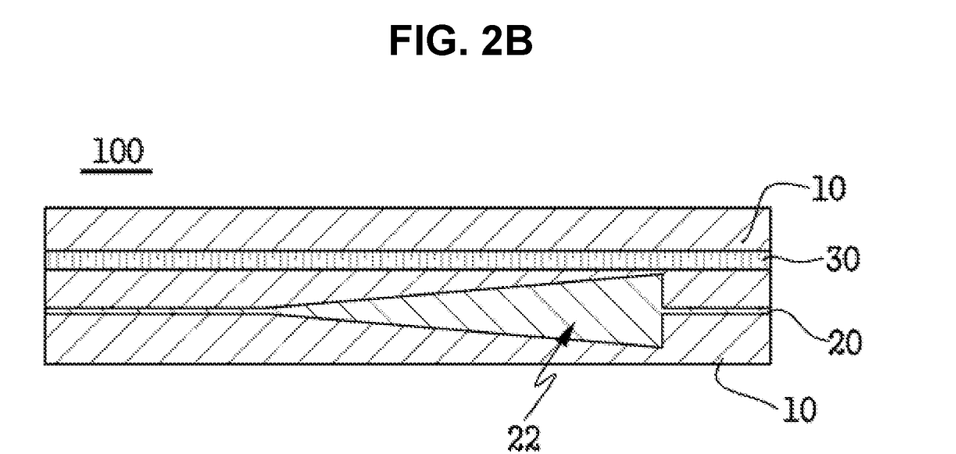
Figure 3A:
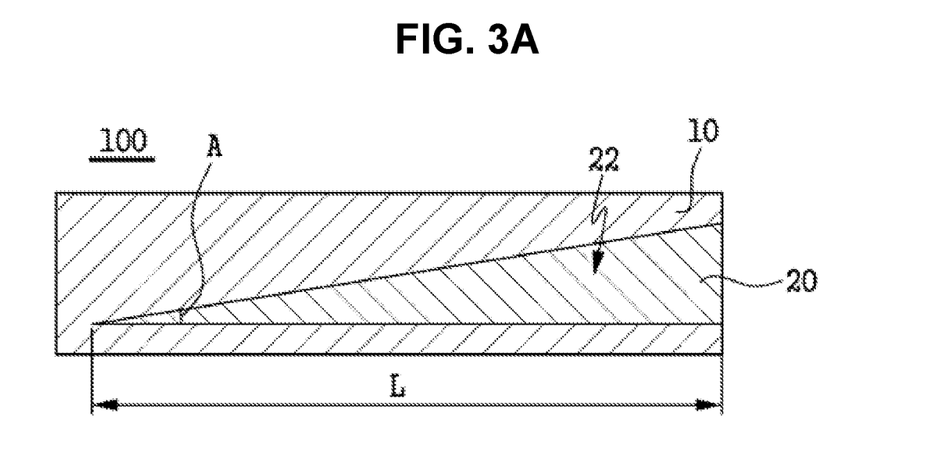
FIGS. 3A and 3B are conceptual views illustrating a structure of a bonding laminated film, in accordance with one or more embodiments, by using cross sections, respectively.
Figure 3B:
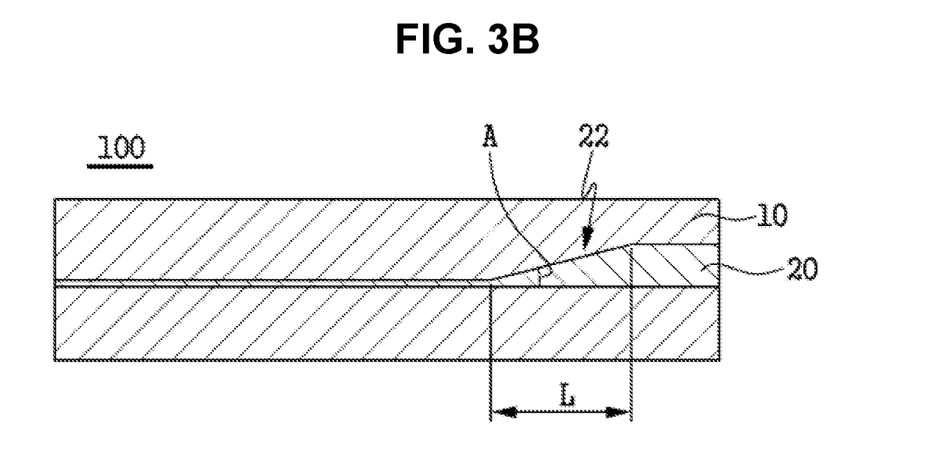
Figure 4A:
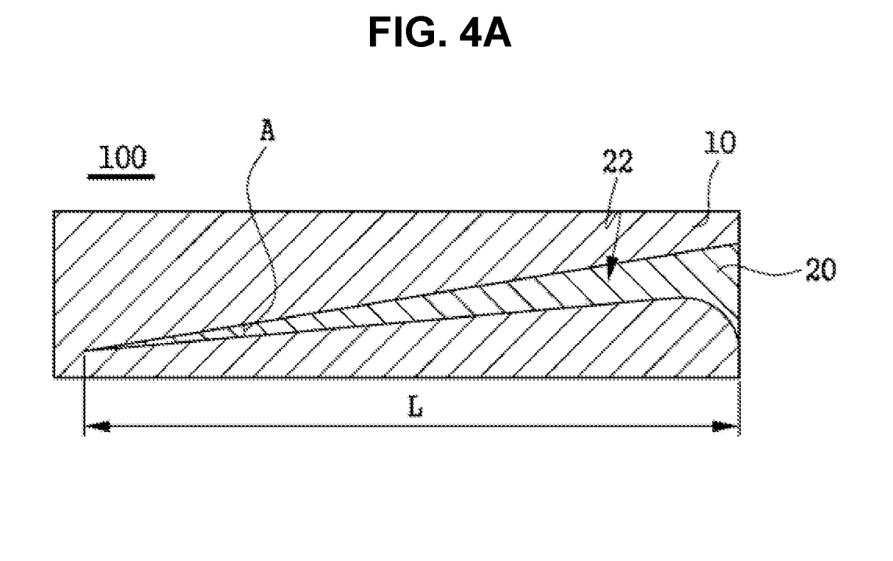
FIGS. 4A and 4B are conceptual views illustrating a structure of a bonding laminated film, in accordance with one or more embodiments, by using cross sections, respectively.
Figure 4B:
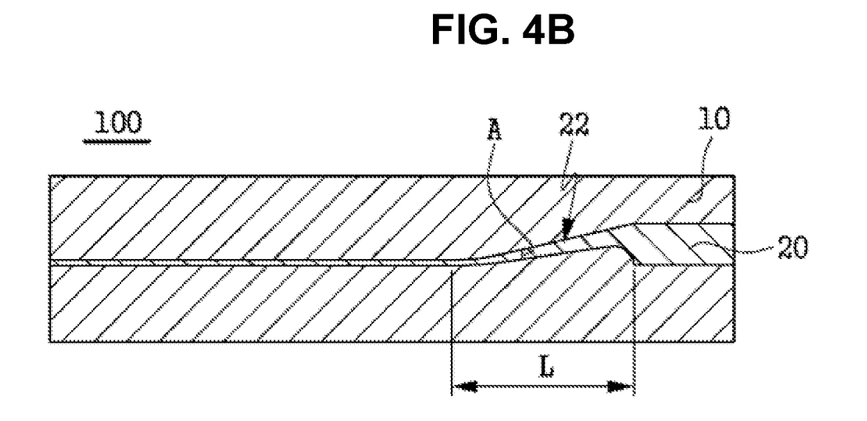

Referring to FIG. 2, the bonding laminated film 100 may further comprise a function layer 30 in addition to the first layer 10 and the second layer 20. The function layer 30 may be a layer having another functionality besides anti-double-image functionality, and may be a sound insulating layer.

The function layer or sound insulating layer 30 may be disposed inside the first layer 10.

The sound insulating layer may be disposed inside the first layer 10 to be disposed between the surface of the first layer 10 and the surface of the second layer 20 neighboring to each other.

The second layer 20 may have a refractive index of 1.55 or more, 1.57 or more, or 1.6 or more. The second layer 20 may have a refractive index of 2.0 or less, or 1.7 or less. Here, the refractive index of the second layer refers to a refractive index in a state of being mixed with an additive or the like, not referring to the refractive index of a resin itself.

The refractive index of the first layer 10 and the second layer 20 may be adjusted by adding an additive, changing the type itself of a resin to be applied, or changing the types of both an additive and a resin.

Additionally, the first layer 10 and the second layer 20 may be layers comprising different resins from each other.

The first layer 10 may comprise a polyvinyl acetal resin, or comprise a polyvinyl acetal resin and a plasticizer.

The first layer 10 may comprise a polyvinyl acetal resin in an amount of 60 to 76 wt %, or 70 to 76 wt %. When applying the polyvinyl acetal resin in this range, it is possible to give a comparatively higher tensile strength and modulus to a laminated film 100.

The polyvinyl acetal resin applied to the first layer 10 may have an acetyl group in an amount of less than 2 mol %, and in detail, in an amount of 0.01 mol % or more and less than 2 mol %. The polyvinyl acetal resin applied to the first layer 10 may have a hydroxyl group in an amount of 30 mol % or more, and in detail, in an amount of 30 to 50 mol %.

When applying a polyvinyl acetal resin having such a characteristic, the first layer 10 can have proper mechanical properties with excellently being bonded with a material such as glass.

A polyvinyl acetal resin applied to the first layer 10 may be a polyvinyl acetal resin obtained by acetalization of a polyvinyl alcohol having a degree of polymerization of 1,600 to 3,000 with aldehyde, or may be a polyvinyl acetal resin obtained by acetalization of a polyvinyl alcohol having a degree of polymerization of 1,700 to 2,500 with aldehyde. When such a polyvinyl acetal resin is applied, mechanical properties like penetration resistance can be sufficiently improved.

The polyvinyl acetal resin may be one synthesized from polyvinyl alcohol and aldehyde, and the aldehyde is not limited in the type. In detail, the aldehyde may be any one selected from the group consisting of n-butyl aldehyde, isobutyl aldehyde, n-valeraldehyde, 2-ethyl butyl aldehyde, n-hexyl aldehyde, and a blend resin thereof. When n-butyl aldehyde is applied as the aldehyde, the produced polyvinyl acetal resin may have a characteristic in refractive index the difference of which with refractive index of glass is small, and a characteristic in excellent adhesion with glass and the like.

The first layer 10 may comprise the plasticizer in an amount of 24 to 40 wt %, or 24 to 30 wt % based on the entire first layer 10. When the plasticizer is comprised in this range, it is good in that proper adhesion and impact resistance can be given to a laminated film for bonding.

In detail, the plasticizer may be any one selected from the group consisting of triethylene glycol bis 2-ethylhexanoate (3G8), tetraethylene glycol diheptanoate (4G7), triethylene glycol bis 2-ethylbutyrate (3GH), triethylene glycol bis 2-heptanoate (3G7), dibutoxyethoxyethyl adipate (DBEA), butyl carbitol adipate (DBEEA), dibutyl sebacate (DBS), bis 2-hexyl adipate (DHA) and a mixture thereof. Specifically, any one selected from the group consisting of triethylene glycol di-2-ethyl butyrate, triethylene glycol di-2-ethylhexanoate, triethylene glycol di-n-heptanoate, and a composition thereof may be comprised as the plasticizer, and further specifically, triethylene glycol bis 2-ethylhexanoate (3G8) may be applied.

The second layer 20 may be a layer having a higher refractive index compared to the first layer 10. Specifically, a polyvinyl acetal resin applied to the first layer 10 may be mixed with a high refractive index material to be applied as the second layer 20, or a different kind of resin not being a polyvinyl acetal resin may be applied.

The second layer 20 may comprise a sulfur-contained resin, a halogen-contained resin, or a phosphorus-contained resin. As the sulfur-contained resin, a resin comprising any one residue selected from the group consisting of linear thioether, sulfone, cyclic thiophene, thiadiazole, thianthrene, and a composition thereof may be applied. The halogen-contained resin may be a resin comprising any one selected from the group consisting of bromine (Br), iodine (I), and a composition thereof. The phosphorus-contained resin may be a polymer resin containing phosphorus in the backbone or side chain of a molecule. The sulfur-contained resin, the halogen-contained resin, or the phosphorus-contained resin may further comprise an additive which is a high refractive index material such as zirconium oxide, ZnCl, or Tinuvin P.

Specifically, the second layer 20 may apply a sulfur-contained resin, and a thiol polyurethan resin may be applied alone or together with an additive. When a sulfur-contained resin is applied to the second layer, defects in optical properties are small though the polymerization degree of a polymer is high, and it is advantageous for obtaining a stable high refractive index effect desired from a wedge part.

When a sound insulation function layer is applied as the function layer 30, the function layer may comprise a polyvinyl acetal resin in an amount of 54 to 76 wt %, or 60 to 70 wt %.

A polyvinyl acetal resin of the function layer 30 may have an acetyl group in an amount of 8 mol % or more, and specifically, 8 to 30 mol %.

A polyvinyl acetal resin of the function layer 30 may be a polyvinyl acetal resin obtained by acetalization of a polyvinyl alcohol having a degree of polymerization of 1,200 to 3,000, or 1,600 to 2,400 with aldehyde. In this example, optical properties and miscibility with a plasticizer can be improved.

The function layer 30 may comprise a plasticizer in an amount of 24 to 46 wt %, or 30 to 40 wt %. When the function layer 30 comprises the plasticizer in an amount in this range, sound insulation performance may be more improved.

The detailed description on the plasticizer is overlapped with the above description on the first layer 10 and thus further description is omitted.

The bonding laminated film 100 may satisfy an impact resistance characteristic in accordance with KS L 2007: 2008. The impact resistance characteristic is evaluated after being manufactured into a laminated glass in accordance with the regulation.

The laminated film for bonding 100 may be one satisfying a penetration resistance characteristic in accordance with KS L 2007. The penetration resistance characteristic is evaluated after being manufactured into a laminated glass in accordance with the standard.

A bonding laminated film according to an example has a first side and a second side opposite to the first side, and the bonding laminated film comprises a first layer, and a second layer disposed on the first layer. The second layer comprises a wedge part in part, and the refractive index of the wedge part is higher than the refractive index of the first layer. The detailed description of the wedge part is overlapped with the above and thus further description is omitted.

Either a first side or a second side of the wedge part may be substantially parallel with the first side or the second side of the laminated film.

The detailed description on the second layer is overlapped with the above description and thus further description is omitted.

The laminated film for bonding may further comprise a third layer on the second layer. The third layer may be disposed in the position opposite to the first layer based on the second layer.

The more detailed description on the first layer and the third layer is overlapped with the above description on the first layer and thus further description is omitted.

The distance between the first side and the second side of the bonding laminated film has a characteristic of being substantially even in a width direction of the laminated film for bonding.

A laminated film having these characteristics has a comparatively even thickness overall for easy storage and can also have HUD (head up display) functionality.

Figure 5A:
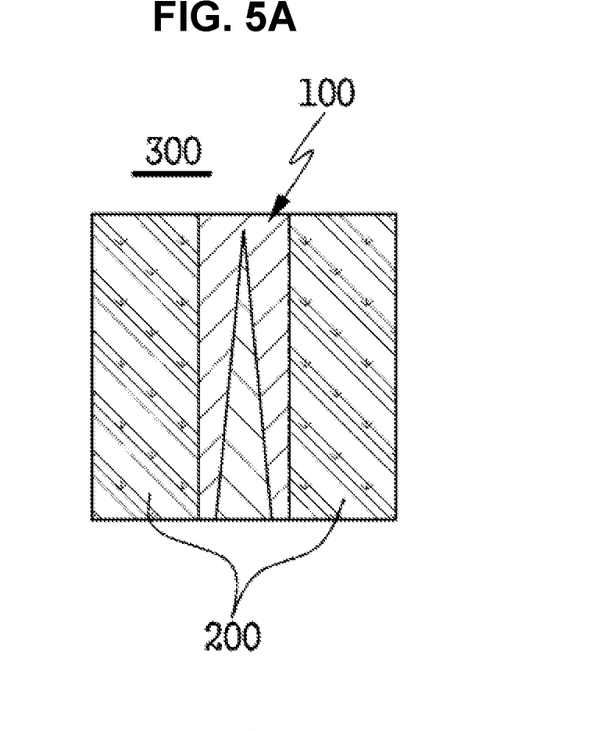
FIGS. 5A and 5B are conceptual views illustrating a structure of a bonding laminated film, in accordance with one or more embodiments, by using cross sections, respectively.
Figure 5B:
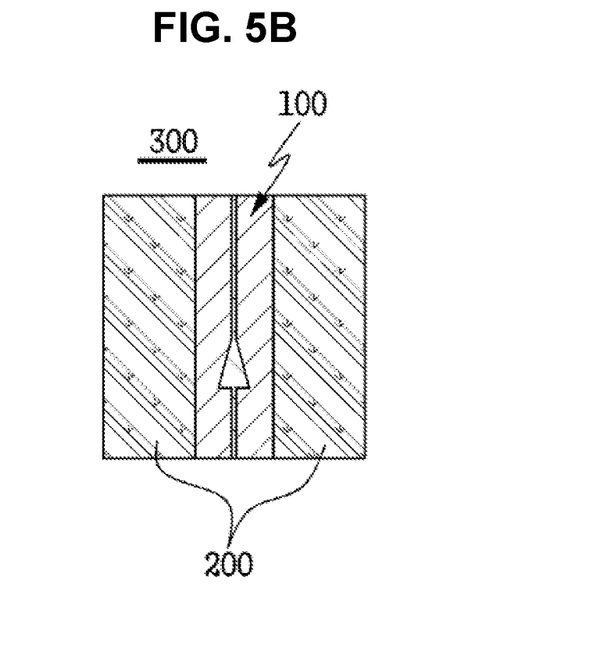

FIGS. 5A and 5B are respectively conceptual views illustrating a structure of a light transmission laminate, in accordance with one or more embodiments, by using cross sections.

Referring to FIGS. 5A and 5B, a light transmission laminate, in accordance with one or more embodiments, is described. A light transmission laminate 300, in accordance with one or more embodiments, comprises a first light transmission layer 200; a bonding laminated film 100 disposed on one side of the first light transmission layer 200, and a second light transmission layer 200 disposed on one side of the bonding laminated film.

The first light transmission layer 200 and the second light transmission layer 200 may be respectively independently a light transmission glass, or a light transmission plastic.

The detailed description on the bonding laminated film 100 is overlapped with the above description and thus further description is omitted.

The light transmission laminate 300 can maintain light transmission characteristics of the first light transmission layer 200 and the second light transmission layer 200 in a nearly same level, and can have characteristics necessary for a safety glass such as impact resistance and penetration resistance, and in which light transmission layers in both sides may be bonded by the bonding laminated film 100.

The light transmission laminate 300 can satisfy an impact resistance characteristic in accordance with KS L 2007: 2008.

The light transmission laminate 300 can satisfy a penetration resistance characteristic in accordance with KS L 2007.

The light transmission laminate 300 may further have a sound insulation characteristic, and this has excellent functionality when applied as a glass of automobiles, a cladding of architecture, and the like.

Manufacture Examples

Respective components used in the above examples are the same as below.

First Polyvinyl Butyral Resin: a polyvinyl alcohol in an average polymerization degree of 1700, a hydroxyl group in an amount of 45 mol %, and an acetyl group in an amount of 1 mol %.

Plasticizer: triethylene glycol bis 2-ethylhexanoate (3G8) available from PROVIRON PROVIST 1766.

Thiol Polyurethan Resin: thiol polyurethan resin (manufactured by SKC).

1) Experiment Example 1

A composition for a first layer comprising a first polyvinyl butyral resin of 73 wt % and a plasticizer of 27 wt % was applied as a first layer, and thiol polyurethan resin was applied as a second layer, to be manufactured into a film in a form of FIG. 1 (b) by a co-extrusion method applying a small extruder.

An example not applied with the first layer was a comparative example and manufactured into a film with a thickness of about 780 μm to have lengths of 300 mm in a width direction and 300 mm in a length direction.

Examples 1 and 2 applied with all the first layer and the second layer were manufactured to have a wedge angle and a length of wedge part in below Table 1. An isosceles triangle shape was applied as the shape of the wedge part.

2) Evaluation Example

Whether a double image occurs: Two pieces of glass of 2.1 T (mm, same as below) were bonded to both sides of the laminated film for bonding by a general method thereby manufacturing a laminated glass.

The laminated glass was evaluated after being tilted in an angle of about 38.5 based on a virtual line perpendicular to the ground. Light was transmitted from a light source 1.5 m away from the tilted laminated glass and when double image unification was observed, it was evaluated as P, and when not observed, it was evaluated as F.

TABLE 1

|  | Wedge Angle (A, degree) | Length of Wedge Part (L, mm) | Whether Double Image Occurred |
| --- | --- | --- | --- |
| Comparative Example | — | — | F |
| Example 1 | 0.174 | 80 | P |
| Example 2 | 0.435 | 100 | P |

Referring to the result of above Table 1, double image unification was observed within a distance of 1 m to 2 m in Examples, compared to a Comparative Example, in which a double image was observed with being unrelated with the distance, and it could be verified that a bonding laminated film having a wedge shape inside a film also have an anti-double-image effect though not having overall a wedge shape in a film. Also, the examples had an even thickness in a film overall so that it was verified not having a problem of wrinkle occurrence when winded.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A bonding laminated film, comprising:
    a first layer comprising a first surface, and a second surface opposite to the first surface, and a second layer disposed inside the first layer,
    wherein the second layer comprises a wedge part disposed either partially in the second layer or through an entirety of the second layer,
    a refractive index of the wedge part is higher than a refractive index of the first layer, and
    the wedge part has a wedge angle of 0.174 degrees to 0.8 degrees.
2. The bonding laminated film of claim 1,
    wherein a distance between the first surface and the second surface is even in a width direction of the bonding laminated film.
3. The bonding laminated film of claim 1,
    wherein a difference between the refractive index of the wedge part and the refractive index of the first layer is equal to or greater than 0.08.
4. The bonding laminated film of claim 1,
    wherein the length of the wedge part is equal to or greater than 7 cm.
5. The bonding laminated film of claim 1,
    wherein the wedge part is disposed in a position of 10% to 50% from a side of an edge, when a width of the bonding laminated film is designated as 100%.
6. The bonding laminated film of claim 1,
    wherein the wedge part is configured to have a thicker portion which has a thickness of 300 μm or less.
7. The bonding laminated film of claim 1,
    wherein a resin of the first layer is different from a resin of the second layer.
8. The bonding laminated film of claim 1, further comprising:
    a function layer, configured to have sound insulation functionality,
    wherein the function layer is disposed inside the first layer.
9. The bonding laminated film of claim 1,
    wherein the function layer is disposed on one side of the second layer.
10. The bonding laminated film of claim 1,
    wherein the second layer has a refractive index of 1.55 or more.
11. The bonding laminated film of claim 1,
    wherein the first layer has a refractive index less than 1.50.
12. A light transmission laminate, comprising:
    a first light transmission layer;
    a bonding laminated film disposed on one side of the first light transmission layer; and
    a second light transmission layer disposed on the bonding laminated film;
    wherein the bonding laminated film is according to claim 1.

* * * * *